(12) United States Patent
Okamoto

(10) Patent No.: US 6,639,731 B1
(45) Date of Patent: Oct. 28, 2003

(54) ZOOM LENS BARREL ASSEMBLY OF CAMERA

(75) Inventor: Hajime Okamoto, Kawasaki (JP)

(73) Assignee: Primax Electronics, Ltd. (TW)

( * ) Notice: Subject to any disclaimer, the term of this patent is extended or adjusted under 35 U.S.C. 154(b) by 0 days.

(21) Appl. No.: 10/196,456

(22) Filed: Jul. 16, 2002

(51) Int. Cl.$^7$ ............................................... G02B 15/14
(52) U.S. Cl. ...................................... 359/701; 359/700
(58) Field of Search ................................ 359/694, 699, 359/700, 701, 703, 704, 823

(56) References Cited

U.S. PATENT DOCUMENTS

| | | | |
|---|---|---|---|
| 4,993,815 A | * 2/1991 | Yamazaki et al. | 359/699 |
| 6,204,977 B1 | * 3/2001 | Iwasa | 359/700 |
| 6,445,517 B1 | * 9/2002 | Nomura et al. | 359/823 |
| 6,469,841 B2 | * 10/2002 | Nomura et al. | 359/699 |

* cited by examiner

Primary Examiner—Ricky Mack
(74) Attorney, Agent, or Firm—Madson & Metcalf

(57) ABSTRACT

A zoom lens barrel assembly is disclosed. The zoom lens barrel assembly includes: an outer barrel provided on the inner peripheral surface thereof with at least one key guide groove and at least one cam groove; a middle barrel fitted into the outer barrel and provided on the outer peripheral surface of the front portion thereof with at least one guide key, a flange and a circumferential groove adjacent to the flange, wherein the guide key is positioned in the key guide groove of the outer barrel; a middle guide ring rotatably mounted on the front end of the middle barrel, and having at least one penetrated hole on the outer periphery thereof and a slider way therein; and at least one cam follower pin, one end of which is piercing through the penetrated hole of the guide ring and disposed in the circumferential groove of the middle barrel and the other end of which is movable disposed in said cam groove of said outer barrel.

20 Claims, 8 Drawing Sheets

ZOOM LENS BARREL ASSEMBLY OF CAMERA

FIELD OF THE INVENTION

The present invention relates to a zoom lens of a camera, and more particularly to a zoom lens barrel assembly of a camera.

BACKGROUND OF THE INVENTION

A telescoping type of zoom lens having a plurality of concentrically arranged moving barrels is Well known. This type of zoom lens is widely utilized in a camera for reducing the thickness of the camera when it is not in use. The conventional zoom lens is formed of a fixed barrel, an outer barrel fitted into the fixed barrel and a plurality of moving barrels. The outer barrel is provided on the inner peripheral surface thereof with a plurality of cam grooves for receiving therein a plurality of cam follower pins. Various moving barrels are fitted into the outer barrel for housing a first group of lenses and a second group of lenses. When the outer barrel is driven to move and rotate relative to the fixed barrel, the outer barrel can carry the moving barrels to move along the direction of the optical axis. Thereby, the optical system of the camera is formed.

The driving system for controlling the movements of the barrels is different from that for controlling the motions of the shutter. For example, the shutter, which is mounted in one of the moving barrels, is driven by a step motor. When the first group and the second group of lenses are moved to respective positions corresponding to a set focal length by the moving barrels, the shutter is driven by the step motor for taking a photograph, which is well known to one skilled in the art.

Please refer to FIG. 1, which is a longitudinal section view of the conventional zoom lens barrel. As shown in FIG. 1, a middle barrel 104 is fitted into the outer barrel 103 to relatively move. A guide ring 105 is mounted on the front end of the middle barrel 104 for guiding the linear moving barrel 102 to move along the direction of the optical axis. Three cam follower pins 107 are respectively mounted in the penetrated holes 1051 of the guide ring 105 to be served as supporters in the conventional method for keeping the moving range of the optical system. Recently, the camera has a design tendency of long focal length and wide moving range of the zoom lens barrels. However, when the rotating angle of the outer barrel is too small, the guide grooves formed on the inner periphery of the outer barrel 103 must be designed to have cliffy oblique angle. In this situation, the torque for rotating the outer barrel 103 will go beyond the requirement. Therefore, the conventional zoom lens barrel structure is unstable.

Certainly, in order to increase the moving range of the optical system and allow the cam follower pins 107 to rotate at a total rotating angle larger than 120, the gradient of the guide grooves of the outer barrel 103 is released. However, keeping the moving range of the cam follower pins 107 along the direction of optical axis would lead to the assembly of the guiding ring 105 and the middle barrel 104 hard. Recently, in order to solve the above-mentioned problems and allow the middle barrel 104 to rotate at a rotating angle larger than 120, the guide ring 105 is provided with a hook structure 1052 as shown in FIG. 2. However, in order to avoid the disengagement of the guide ring 105 and the middle barrel 104, the guide ring 105 must employ at least three hooks to hook the front end of the middle barrel 104. However, the hooks will deform and the guide ring 105 will disengage from the linear moving barrel 104 when a powerful external force is exerted upon the guide ring 105.

In addition, when the hooks are respectively forced to engage with the middle barrel 104, those parts will result in deformation due to the powerful external force. Therefore, it is required to reserve a buffer space. However, such design will result in the existence of the clearance between those parts and derivate native influences on the optical system of a camera.

Therefore, it is desired for the applicant to develop a suitable zoom lens barrel assembly, which allows the middle barrel 104 thereof to move linearly and rotate in a rotating angle larger than 120, allows the guide ring 105 thereof to move with the middle barrel 104 along the direction of optical axis, and employs a plurality of cam follower pins 101 to guide the middle barrel 104 to move along the direction of optical axis. And, the cam follower pins can be respectively assembled with the guide ring 105 and middle barrel 104 simply and correctly without exerting a powerful external force upon the cam follower pins 101.

SUMMARY OF THE INVENTION

It is therefore an object of the present invention to provide a zoom lens barrel assembly which allows the middle barrel thereof to move linearly and rotate in a rotating angle larger than 120, allows the guide ring thereof to move with the middle barrel along the direction of optical axis, and employs a plurality of cam follower pins to guide the middle barrel to move along the direction of optical axis.

To achieve the object of the present invention, a zoom lens barrel is provided. The zoom lens barrel includes a moving barrel provided on the outer peripheral surface of the front portion thereof with a flange and a circumferential groove adjacent to the flange, a guide ring having at least one penetrated hole on the outer peripheral surface thereof and a slider way therein, and at least one cam follower pin having one end piercing through the penetrated hole of the guide ring and disposed in the circumferential groove of the moving barrel. The flange of the moving barrel is received in the slider way of the guide ring and limited by the end of the cam follower pin, thereby the guide ring is rotatably mounted on the front portion of the moving barrel.

Preferably, the cam follower pin has a semicircle-shaped projection and a flat surface on the end. More preferably, the other end of the cam follower pin has a taper portion.

There is further an object of the present invention to provide a zoom lens barrel assembly. The zoom lens barrel assembly includes: an outer barrel provided on the inner peripheral surface thereof with at least one key guide groove and at least one cam groove; a middle barrel fitted into the outer barrel and provided on the outer peripheral surface of the front portion thereof with at least one guide key, a flange and a circumferential groove adjacent to the flange, wherein the guide key is positioned in the key guide groove of the outer barrel; a middle guide ring rotatably mounted on the front end of the middle barrel, and having at least one penetrated hole on the outer periphery thereof and a slider way therein; at least one cam follower pin, one end of which is piercing through the penetrated hole of the guide ring and disposed in the circumferential groove of the middle barrel and the other end of which is movable disposed in the cam groove of the outer barrel; and an inner barrel fitted into the middle barrel.

In accordance with one aspect of the present invention, the zoom lens barrel assembly further includes a fixed barrel provided on the inner peripheral surface thereof with female helicoids which are engaged by male helicoids formed on the outer peripheral surface of the outer barrel.

Preferably, the key guide groove is extending parallel to the direction of optical axis and the cam groove is formed oblique to the optical axis.

Preferably, the guide key of the middle barrel is projecting outwardly from the middle barrel in a radial direction.

In accordance with another aspect of the present invention, the flange of the middle barrel is provided on the outer peripheral surface of the front end of the middle barrel.

In accordance with another aspect of the present invention, the zoom lens barrel assembly further includes a first guide plate secured to the middle guide ring by screws.

In accordance with another aspect of the present invention, the first guide plate has a plurality of L-shaped guide projections respectively inserted into the rectangle guide channels formed on the middle guide ring.

In accordance with another aspect of the present invention, each of the L-shaped guide projection is extending parallel to the optical axis.

In accordance with another aspect of the present invention, the zoom lens barrel assembly further includes a second guide plate provided on the rim thereof with a plurality of guide projections, wherein each of the guide projections is respectively extending downwardly from the rim thereof In accordance with another aspect of the present invention, portions of the guide projections are slidably mounted in the key guide channel formed on the inner peripheral surface of the fixed barrel, and the other portion of the projections are respectively inserted into the corresponding rectangle guide channels formed on the middle guide ring to prevent the middle guide ring from rotating relative to the fixed barrel.

In accordance with another aspect of the present invention, the zoom lens barrel assembly further includes an outer barrel guide ring secured to the second guide plate by screws.

In accordance with another aspect of the present invention, the clearance formed between the outer barrel guide ring and the second guide plate is employed to clip the inner extending ring formed on the outer barrel.

In accordance with another aspect of the present invention, the inner barrel is provided on the outer peripheral surface thereof with male helicoids which are engaged by female helicoids formed on the inner peripheral surface of the middle barrel.

In accordance with another aspect of the present invention, the zoom lens barrel further includes a linear barrel fitted into the inner barrel.

In accordance with another aspect of the present invention, the inner barrel is provided on the inner peripheral surface thereof with at least one linear strip which is engaged by at least one key guide channel formed on the outer peripheral surface of the linear barrel.

In accordance with another aspect of the present invention, the zoom lens barrel further includes a spring disposed between the linear barrel and the inner barrel.

In accordance with another aspect of the present invention, the cam follower pin has a semicircle-shaped projection and a flat surface on the end.

Now the foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following description of the preferred embodiment of this invention is presented herein for purpose of illustration and description only; it is not intended to be exhaustive or to be limited to the precise form disclosed.

Figure 1:
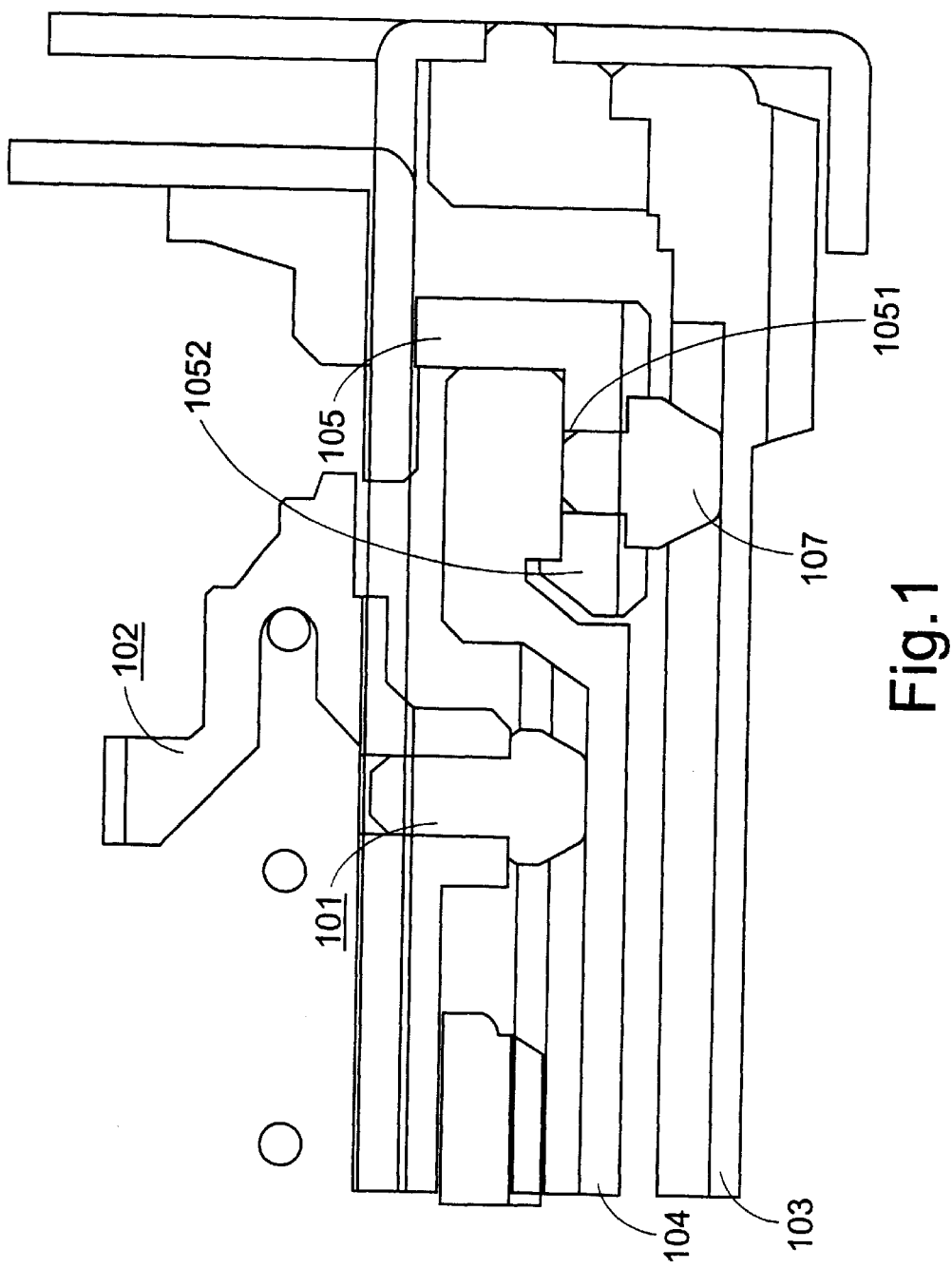
FIG. 1 is a longitudinal section view of the conventional zoom lens barrel.
Figure 2:
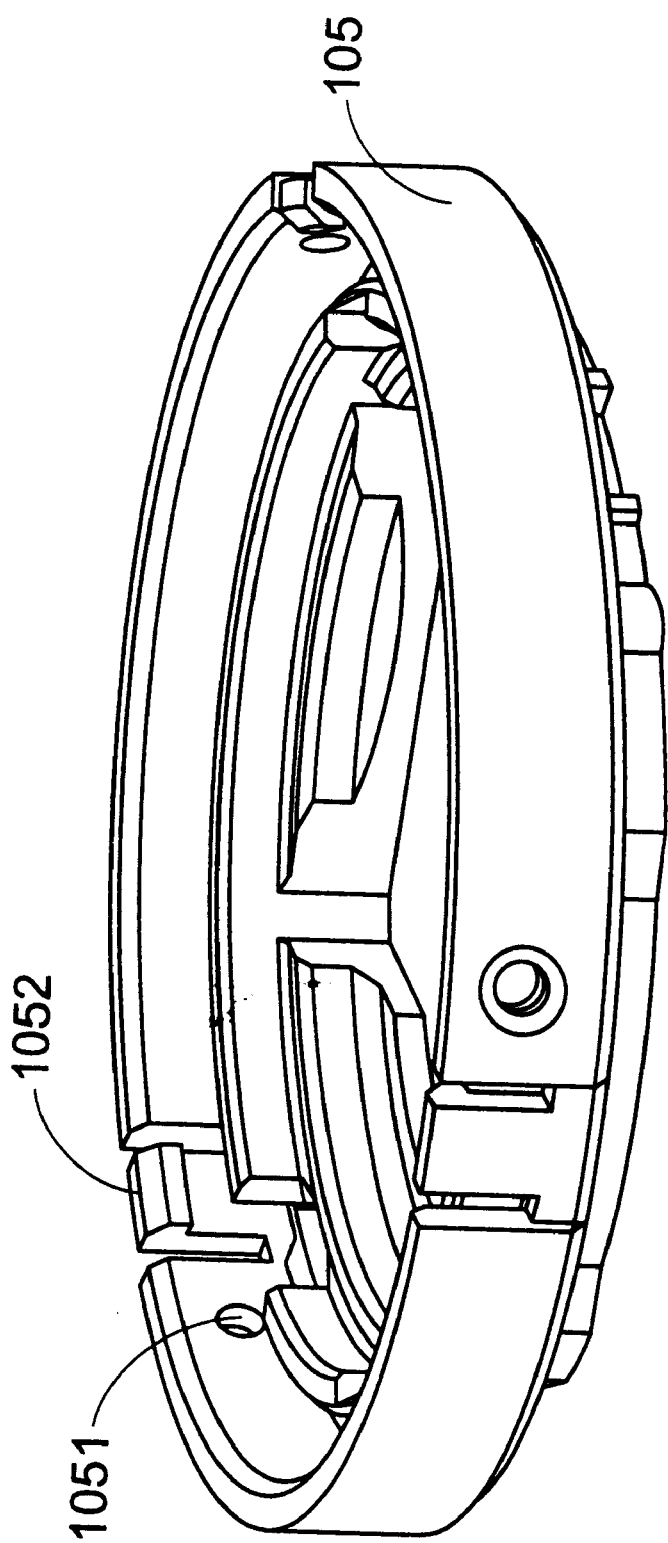
FIG. 2 is a structural view of the guide ring of FIG. 1.
Figure 3A:
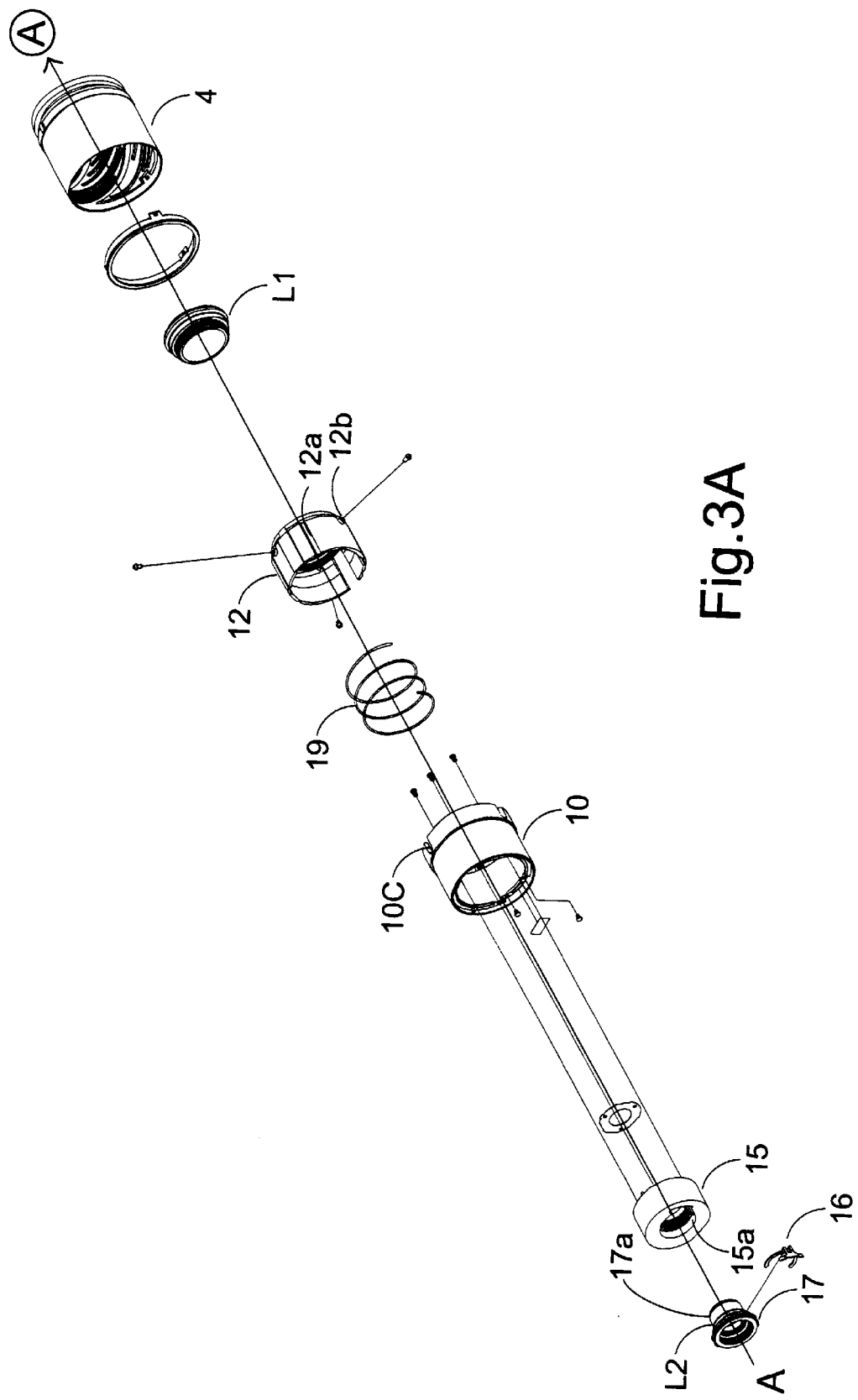
FIG. 3 is an exploded perspective view showing the structure of a zoom lens barrel assembly according to the preferred embodiment of the present invention.
Figure 3B:
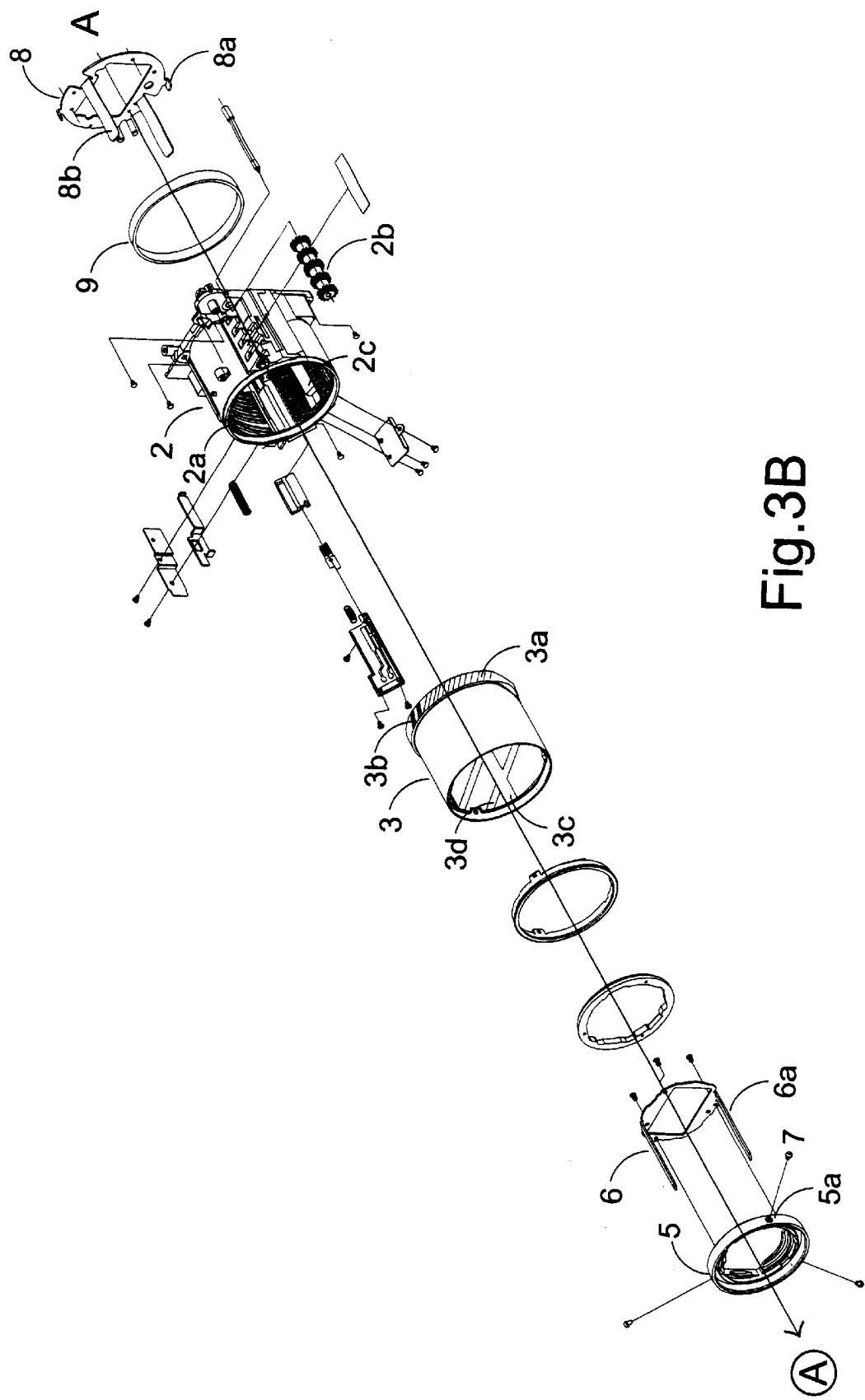
Figure 4:
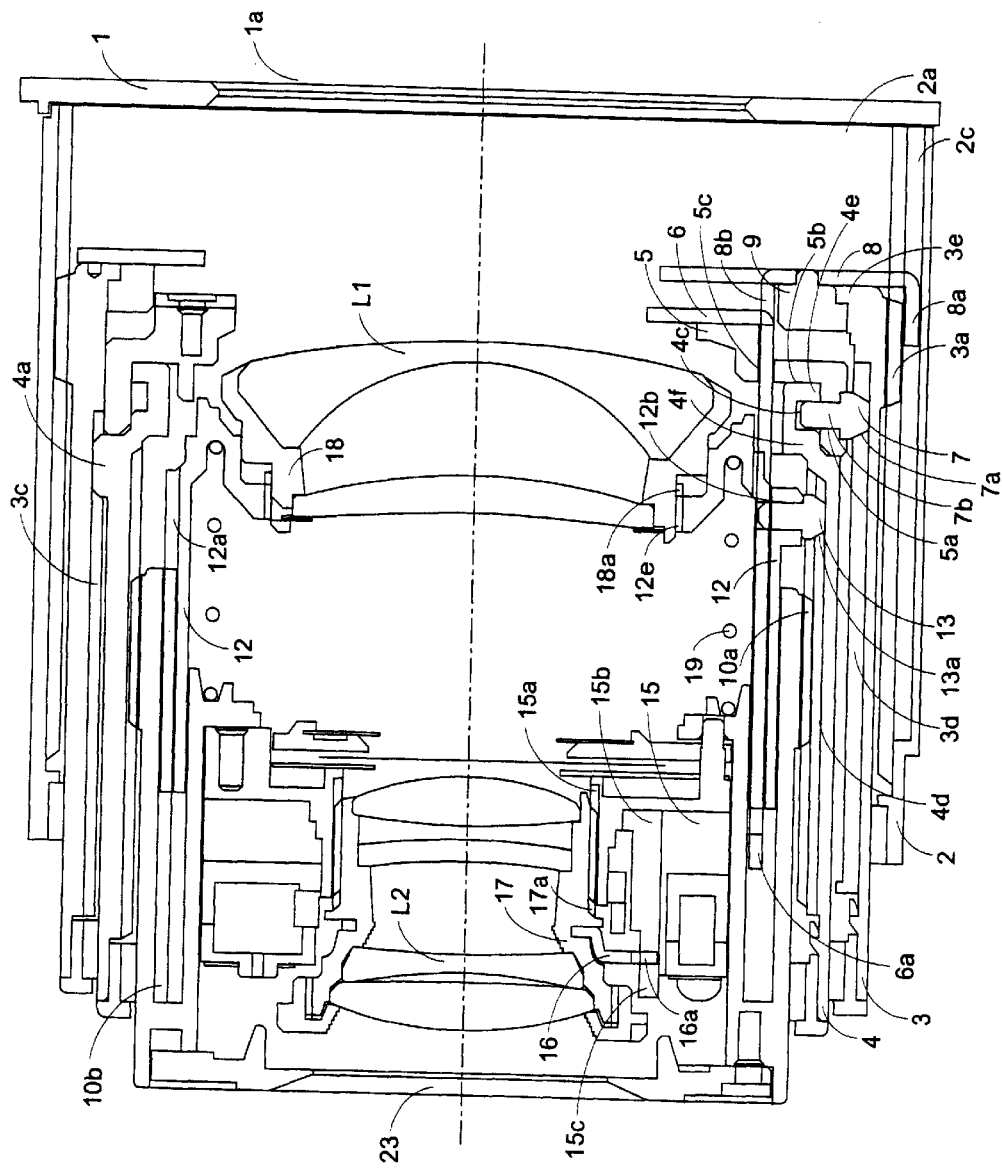
FIG. 4 is a longitudinal section view showing the structure of the zoom lens barrel assembly of FIG. 3.

Please refer to FIGS. 3 and 4, which are respectively an exploded perspective view and a longitudinal section view showing the structure of the zoom lens barrel assembly according to the preferred embodiment of the present invention. As shown in FIG. 3, the zoom lens barrel assembly is formed of a fixed barrel 2, an outer barrel 3, a middle barrel 4, a middle guide ring 5, a first guide plate 6, a second guide plate 8, an inner barrel 10, and a linear barrel 12. The fixed barrel 2 is secured to a camera body 1 by screws and fixed at the position relative to the coated surface of a film 1a, which is loaded in the camera body 1. The fixed barrel 2 is provided on the inner peripheral surface thereof with female helicoids 2a which are engaged by male helicoids 3a formed on the outer peripheral surface of the outer barrel 3. The outer barrel 3 is fitted into the fixed barrel 2 and provided on the outer peripheral surface thereof with tooth 3b. The tooth 3b are engaged by tooth of a gear 2b so that the outer barrel 3 could be rotated by a drive means (not shown) via the gear 2b. When the rotation of the outer barrel 3 occurs, the outer barrel 3 is moved forwardly and backwardly in the direction of optical axis through the engagement between the female and male helicoids 2a and 3a.

Figure 5:
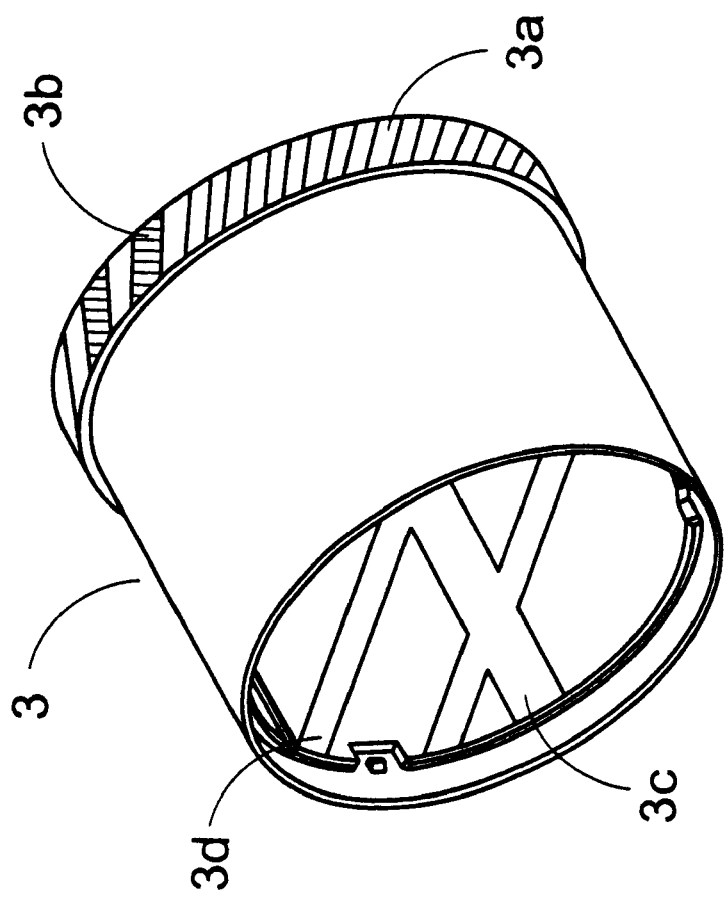
FIG. 5 is a structural view showing the outer barrel of FIG. 3.

Please refer to FIG. 5, which is the structural view showing the outer barrel of FIG. 3. As shown in FIG. 5, a plurality of key guide grooves 3c and cam grooves 3d are provided on the inner peripheral surface of the outer barrel 3. Each of the key guide grooves 3c is extending parallel to the optical axis, and each of the cam grooves 3d is formed oblique to the optical axis.

Figure 6:
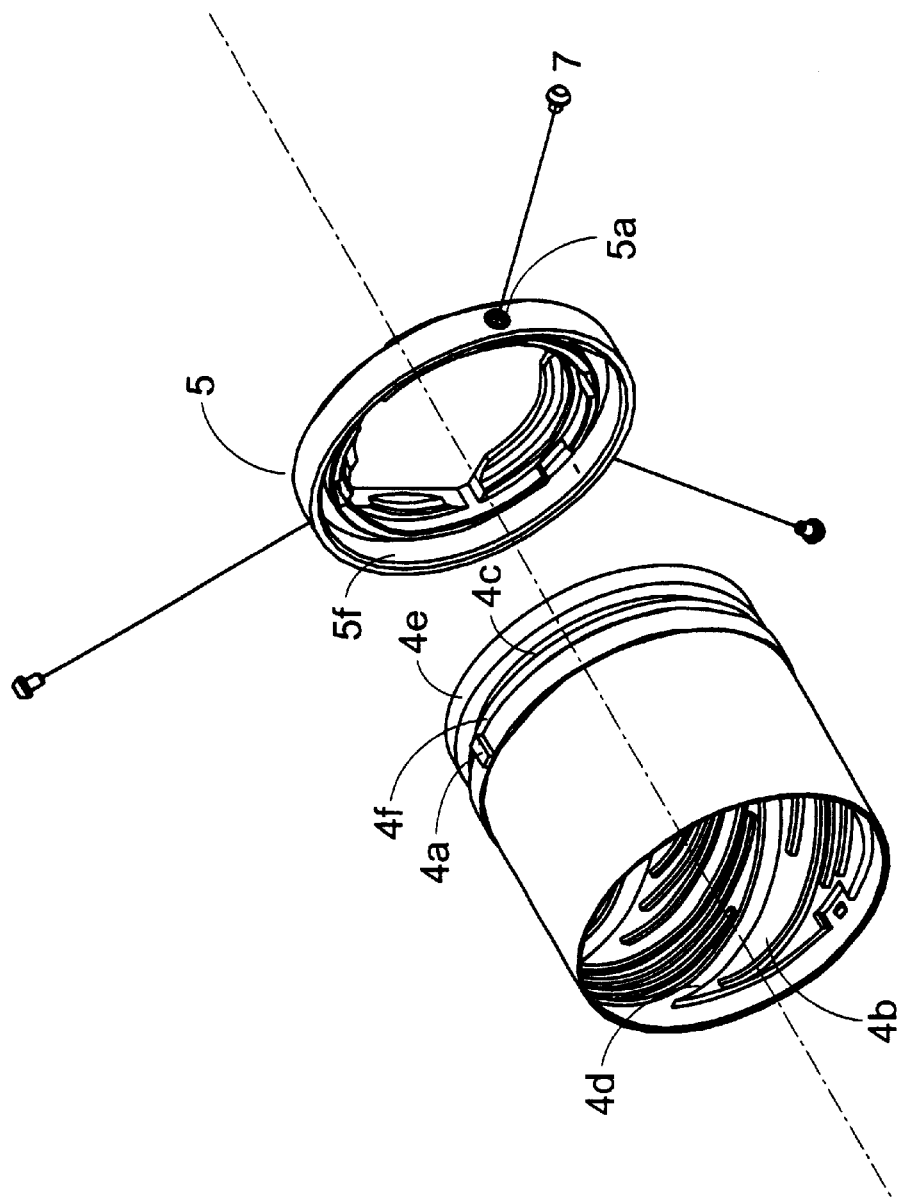
FIG. 6 is the structural view showing the assembly of the middle barrel and the middle guide ring of FIG. 3.

Please refer to FIG. 6, which is the structural view showing the assembly of the middle barrel 4 and the middle guide ring 5 of FIG. 3. As shown in FIG. 6, the middle barrel 4 is provided on an outer peripheral surface of the front portion thereof with a plurality of guide keys 4a, each of which is projecting from the middle barrel 4 in a radial direction. The middle barrel 4 is further provided on the outer peripheral surface of the front end thereof with an end flange 4e and a retaining flange 4f adjacent to the end flange 4e. A circumferential groove 4c is formed between the end flange 4e and the retaining flange 4f. The middle guide ring 5 is rotatably mounted on the front end of the middle barrel 4. The middle guide ring 5 is provided on the outer peripheral surface thereof with a plurality of penetrated holes 5a, each of which is capable of being mounted with a corresponding cam follower pin 7.

Please refer to FIG. 4 again. When the middle guide ring 5 is mounted on the front end of the middle barrel 4, each of the penetrated holes 5 is aligned with the circumferential groove 4c and allows a corresponding cam follower pin 7 to be inserted thereinto. One end of the cam follower pin 7 is piercing through the penetrated holes 5a of the middle guide ring and positioned in the circumferential groove 4c of the middle barrel 4. The end flange 4e of the middle barrel 4 is received in between the slider way 5f of the middle guide ring 5 and limited by the end of the cam follower pin 7 so that the middle guide ring 5 can be rotatably mounted on the middle barrel 4. Therefore, the cam follower pins 7 can slide within the circumferential groove 4c smoothly to allow the middle guide ring 5 to be rotated relative to the middle barrel 4 easily.

Please refer to FIGS. 3 and 4 again. By fitting the combination of the middle barrel 4 and the middle guide ring 5 into the outer barrel 3, the guide keys 4a of the middle barrel 4 are respectively positioned in the corresponding key guide grooves 3c of the outer barrel 3 and taper ends of the cam follower pins 7 are respectively positioned in the corresponding cam grooves 3d of the outer barrel 3. When the middle guide ring 5 rotates in the forward or reverse rotational direction relative to the outer barrel 3, the middle barrel 4 moves linearly forwardly or backwardly along the direction of optical axis, but is restricted from rotating relative to the outer barrel 3.

The first guide plate 6 is secured to the middle guide ring 5 by screws. The L-shaped guide projections 6a of the first guide plate 6 are respectively inserted into the rectangle guide channels 5c of the middle guide ring 5. Each of the L-shaped guide projection 6a is extending parallel to the optical axis.

The second guide plate 8 is provided on the rim thereof with a plurality of guide projections 8a and L-shaped guide projections 8b. The guide projections 8a are respectively extending downwardly from the rim of the second guide plate 8. The guide projections 8a are slidably mounted in the key guide channel 2c of the fixed barrel 2 so that the second guide plate 8 can be moved linearly within the fixed barrel 2. In addition, the L-shaped guide projections 8b are respectively inserted into the corresponding rectangle guide channels 5c to prevent the middle guide ring 5 from rotating relative to the fixed barrel 2.

In addition, an outer barrel guide ring 9 is secured to the second guide plate 8 by screws. The clearance formed between the outer barrel guide ring 9 and the second guide plate 8 is employed to clip the inner extending ring 3e of the outer barrel 3, thereby the outer barrel 3 can carry the second guide plate 8 to move within the fixed barrel 2 linearly.

A plurality of female helicoids 4b and cam grooves 4d are provided on the inner peripheral surface of the middle barrel 4. In addition, the inner barrel 10 is provided on the inner peripheral surface thereof with linear strip 10b which are engaged by the key guide channel 12a formed on the outer peripheral surface of the linear barrel 12, whereby, the linear barrel 12 can move within the inner barrel 10 linearly.

Furthermore, a spring 19 is disposed between the linear barrel 12 and the inner barrel 10. The linear barrel 12 is provided on the outer peripheral surface thereof with a plurality of penetrated holes 12b, each of which is capable of being inserted thereinto a corresponding follower 13. The taper end 13a of the follower 13 is positioned in the cam grooves 4d of the middle barrel 4 through the side guide slit 10c of the inner barrel 10, thereby allowing the inner barrel 10 together with the linear barrel 12 to move relative to the middle barrel 4.

The linear barrel 12 is employed to carry the first group of lens L1. The inner barrel 10 is provided on the outer peripheral surface thereof with male helicoids 10a which are engaged by female helicoids 4b formed on the inner peripheral surface of the middle barrel 4. A shutter unit 15 and a lens carrying barrel 17 are respectively disposed in the inner barrel 10, wherein the shutter unit 15 is mounted in the inner barrel 10 by screws. The shutter unit 15 is provided on the inner peripheral surface thereof with female helicoids 15a which are engaged by male helicoids 17a formed on the outer peripheral surface of the lens carrying barrel 17. The lens carrying barrel 17 is employed to carry the second group of lens L2.

The shutter 15 is provided on the inner peripheral surface thereof with female helicoids 15a and a rotary plate 15b capable of rotating around the direction of optical axis. The L-shaped projection 15c of the rotary plate 15b is clipped by two side parts 16a of the connecting plate 16, which is mounted on the lens carrying barrel 17. When the shutter 15 and the lens carrying barrel 17 are moved together, the lens carrying barrel 17 rotates and moves forwardly to perform automatically focal adjustments.

A decoration plate 23 is mounted on the front of the lens carrying barrel 17. In addition, the linear barrel 12 is provided on the inner peripheral surface thereof with female screw 12e which are engaged by male screw 18a formed on the outer peripheral surface of the lens carrying barrel 18.

Figure 7:
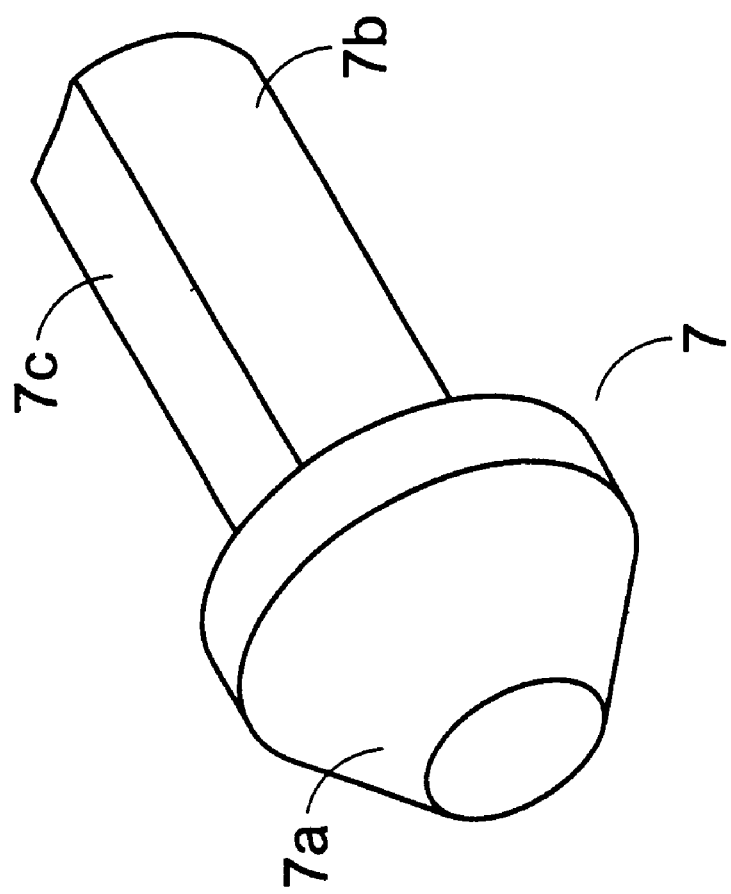
FIG. 7 is the structural view showing the cam follower pin according to another preferred embodiment of the present invention.

Please refer to FIG. 7, which is the structural view showing the cam follower pin according to another preferred embodiment of the present invention. As shown in FIG. 7, the cam follower pin 7 has a semicircle-shaped projections 7b and a flat surface 7c. Therefore, when one end of the cam follower pin 7 is positioned in the circumferential grooves 4c of the middle barrel 4, the semicircle-shaped projections 7b and flat surface 7c can increase the contact surface with the inner surface of circumferential grooves 4c, thereby the middle guide ring 5 can be rotatably mounted on the front end of the middle barrel 4 stably. Certainly, the cam follower pin 7 can also be designed to have a round-shaped projection for increasing the stability of the structure.

The total displacement of the second group of lens L2 is equal to the sum of the displacement of the male helicoids 3a of outer barrel 3, the linear displacement of the cam follower pins 7 and the displacement of the male helicoids 10a of the inner barrel 10. In addition, the total displacement of the first group of lens L2 is equal to the sum of the displacement of the male helicoids 3a of outer barrel 3, the linear displacement of the cam follower pins 7 and the linear displacement of the followers 13. The total displacements of the first group of lens L1 and second group of lens L2 provide predetermined optical values for limiting the movements of various barrels along the direction of optical axis and construct the optical system of a camera which has designed focal length.

As the above mentions, the zoom lens barrel assembly of the present invention not only avoids the parts of the zoom lens barrel assembly from deformation when they are assembled, but also increases the degree of accuracy in assembly. The reservation of buffer spaces therefore is not required. Furthermore, in order to design a camera having a prompt zoom lens structure, a plurality of cam follower pins are provided to cooperate with the middle barrel and the middle guide ring to steady the rotating structure of the zoom lens barrel Even more when the zoom lens barrels are rotated at an angle larger than 360, there is no native influence with respective to the movements of the zoom lens barrels.

While the invention has been described in terms of what are presently considered to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. A zoom lens barrel, comprising:
    a moving barrel provided on the outer peripheral surface of the front portion thereof with a flange and a circumferential groove adjacent to said flange;
    a guide ring having at least one penetrated hole on the outer peripheral surface thereof and a slider way therein; and
    at least one cam follower pin having one end piercing through said penetrated hole of said guide ring and disposed in said circumferential groove of said moving barrel,
    wherein said flange of said moving barrel is received in said slider way of said guide ring and limited by said end of said cam follower pin, thereby said guide ring is rotatably mounted on said front portion of said moving barrel.

2. The zoom lens barrel according to claim 1 wherein said cam follower pin has a flat surface and a semicircle-shaped projection or a round-shaped projection on said end.

3. The zoom lens barrel according to claim 1 wherein the other end of said cam follower pin has a taper portion.

4. A zoom lens barrel assembly, comprising:
    an outer barrel provided on the inner peripheral surface thereof with at least one key guide groove and at least one cam groove;
    a middle barrel fitted into said outer barrel and provided on the outer peripheral surface of the front portion thereof with at least one guide key, a flange and a circumferential groove adjacent to said flange, wherein said guide key is positioned in said key guide groove of said outer barrel;
    a middle guide ring rotatably mounted on the front end of said middle barrel, and having at least one penetrated hole on the outer peripheral surface thereof and a slider way therein;
    at least one cam follower pin, one end of which is piercing through said penetrated hole of said guide ring and disposed in said circumferential groove of said middle barrel and the other end of which is movable disposed in said cam groove of said outer barrel; and
    an inner barrel fitted into said middle barrel.

5. The zoom lens barrel assembly according to claim 4 further comprising a fixed barrel provided on the inner peripheral surface thereof with female helicoids which are engaged by male helicoids formed on the outer peripheral surface of said outer barrel.

6. The zoom lens barrel assembly according to claim 4 wherein said key guide groove is extending parallel to the direction of optical axis and said cam groove is formed oblique to said optical axis.

7. The zoom lens barrel assembly according to claim 4 wherein said guide key of said middle barrel is projecting outwardly from said middle barrel in a radial direction.

8. The zoom lens barrel assembly according to claim 4 wherein said flange of said middle barrel is provided on the outer peripheral surface of the front end of said middle barrel.

9. The zoom lens barrel assembly according to claim 4 further comprising a first guide plate secured to said middle guide ring by screws.

10. The zoom lens barrel assembly according to claim 9 wherein said first guide plate has a plurality of L-shaped guide projections respectively inserted into the rectangle guide channels formed on said middle guide ring.

11. The zoom lens barrel assembly according to claim 10 wherein each of said L-shaped guide projection is extending parallel to the optical axis.

12. The zoom lens barrel assembly according to claim 4 further comprising a second guide plate provided on the rim thereof with a plurality of guide projections, each of said guide projections respectively extending downwardly from the rim thereof.

13. The zoom lens barrel assembly according to claim 12 wherein portions of said guide projections are slidably mounted in the key guide channel formed on the inner peripheral surface of said fixed barrel, and the other portion of said projections are respectively inserted into the corresponding rectangle guide channels formed on said middle guide ring to prevent said middle guide ring from rotating relative to said fixed barrel.

14. The zoom lens barrel assembly according to claim 12 further comprising an outer barrel guide ring secured to said second guide plate by screws.

15. The zoom lens barrel assembly according to claim 14 wherein the clearance formed between said outer barrel guide ring and said second guide plate is employed to clip the inner extending ring formed on said outer barrel.

16. The zoom lens barrel assembly according to claim 4 wherein said inner barrel is provided on the outer peripheral surface thereof with male helicoids which are engaged by female helicoids formed on the inner peripheral surface of said middle barrel.

17. The zoom lens barrel assembly according to claim 4 further comprising a linear barrel fitted into said inner barrel.

18. The zoom lens barrel assembly according to claim 17 wherein said inner barrel is provided on the inner peripheral surface thereof with at least one linear strip which is engaged by at least one key guide channel formed on the outer peripheral surface of said linear barrel.

19. The zoom lens barrel assembly according to claim 17 further comprising a spring disposed between said linear barrel and said inner barrel.

20. The zoom lens barrel assembly according to claim 4 wherein said cam follower pin has a flat surface and semicircle-shaped projection or a round-shaped projection on said end.

* * * * *